US008000056B2

(12) United States Patent
Bates et al.

(10) Patent No.: US 8,000,056 B2
(45) Date of Patent: Aug. 16, 2011

(54) APPARATUS AND METHOD TO ROTATE A READ/WRITE HEAD

(75) Inventors: Allen Keith Bates, Tucson, AZ (US); Nhan Xuan Bui, Tucson, AZ (US); Daniel James Winarsk, Tucson, AZ (US); George G. Zamora, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 12/482,317

(22) Filed: Jun. 10, 2009

(65) Prior Publication Data
US 2010/0315740 A1    Dec. 16, 2010

(51) Int. Cl.
G11B 5/584    (2006.01)
(52) U.S. Cl. .................................................. 360/77.12
(58) Field of Classification Search .................. None
See application file for complete search history.

(56) References Cited

U.S. PATENT DOCUMENTS

| 4,055,849 | A | | 10/1977 | Hickok |
| 4,647,993 | A | * | 3/1987 | Schwarz et al. ................. 360/84 |
| 5,371,638 | A | | 12/1994 | Saliba |
| 5,617,391 | A | * | 4/1997 | Ono et al. .................. 369/44.18 |
| 6,188,535 | B1 | * | 2/2001 | Lemke et al. .................... 360/70 |
| 6,222,698 | B1 | | 4/2001 | Barndt et al. |
| 6,285,519 | B1 | * | 9/2001 | Goker ............................. 360/48 |
| 6,700,729 | B1 | * | 3/2004 | Beck et al. ...................... 360/76 |
| 6,771,456 | B2 | | 8/2004 | Winarski et al. |
| 7,193,812 | B2 | | 3/2007 | Eaton |
| 7,586,709 | B2 | * | 9/2009 | Fukushima et al. ............ 360/75 |
| 2005/0018349 | A1 | | 1/2005 | Eaton |

* cited by examiner

Primary Examiner — K. Wong
(74) Attorney, Agent, or Firm — Dale F. Regelman; Quarles & Brady LLP

(57) ABSTRACT

A method is presented to rotate a read/write head rotatable along a first axis and comprising a first assembly having a first servo element and a second servo element. The method moves a sequential information storage medium adjacent to the read/write head along a second axis, wherein the second axis is substantially orthogonal to the first axis, and determines the rotation angle for the read/write head with respect to the sequential information storage medium using the first servo element and the second servo element. The method then positions the read/write head with respect to the second axis based upon the rotation angle.

20 Claims, 12 Drawing Sheets

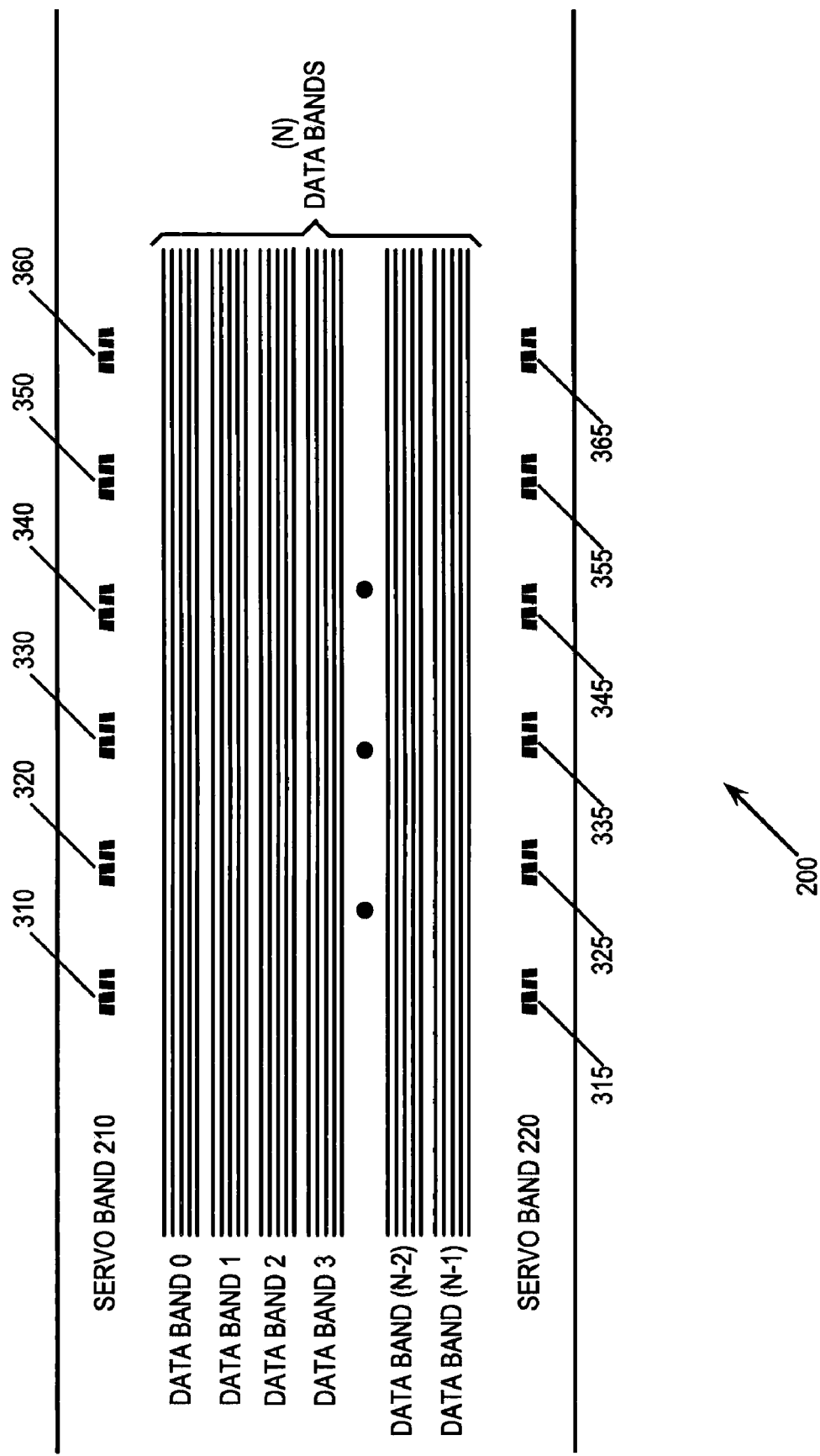

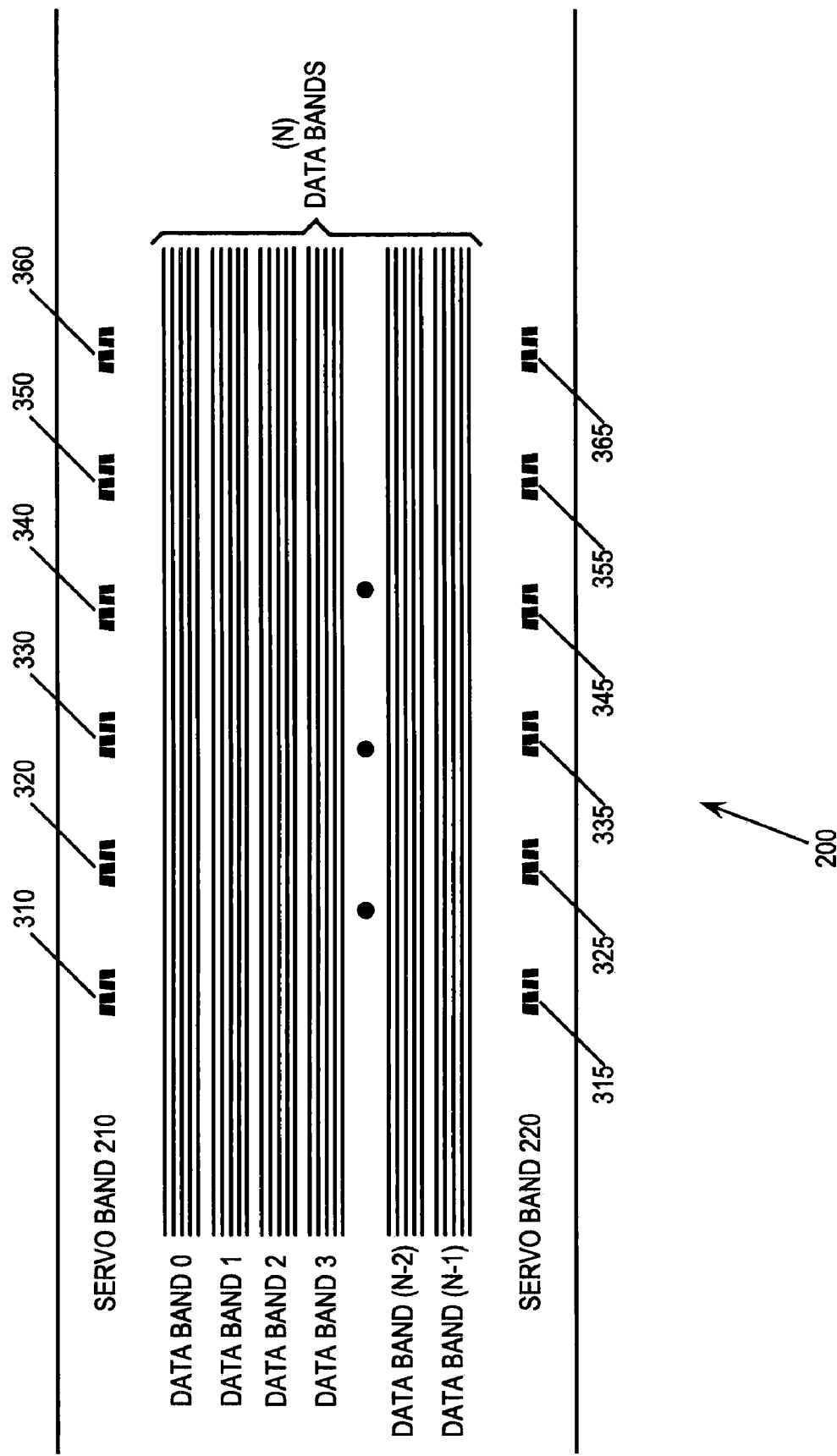

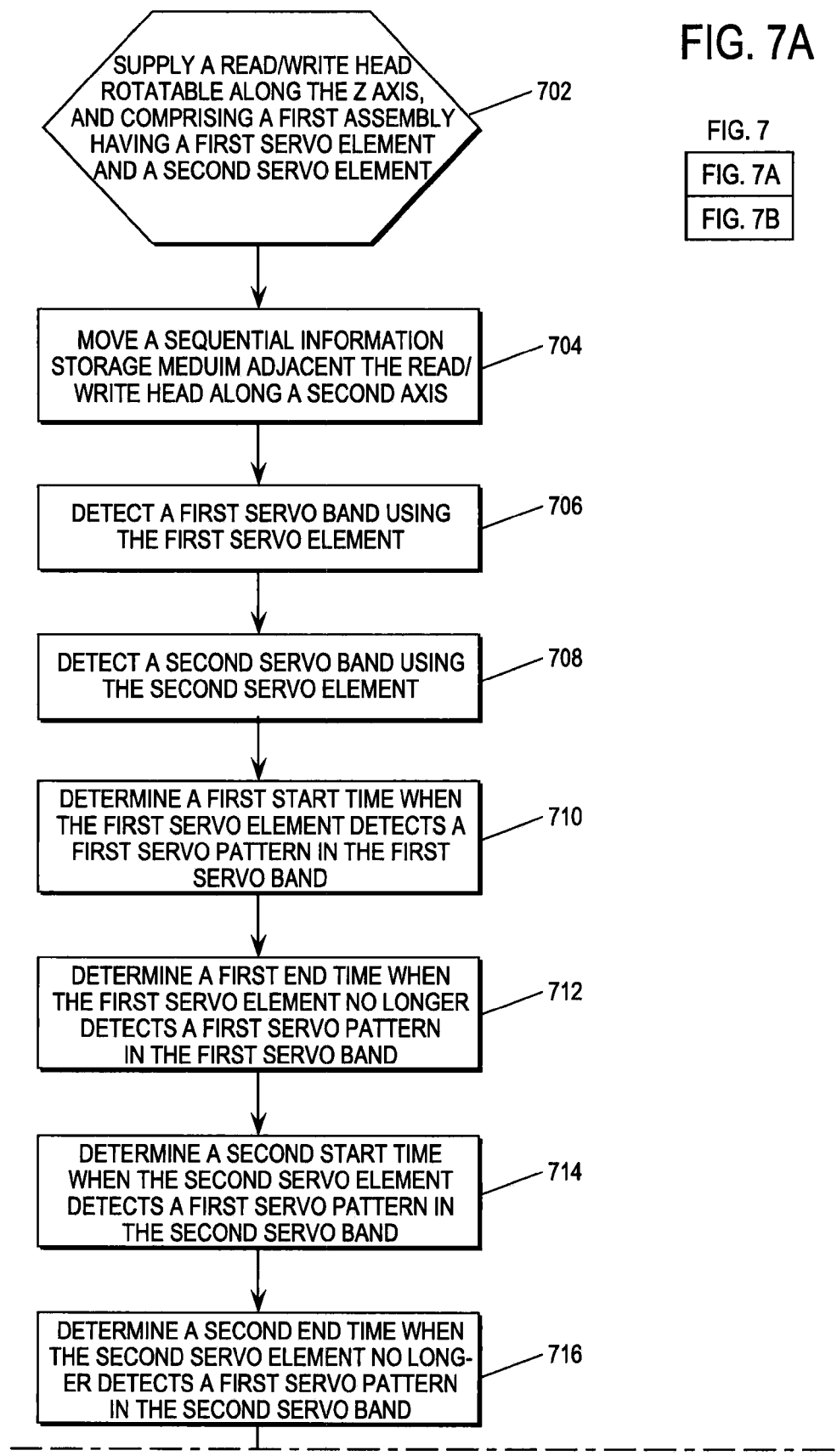

APPARATUS AND METHOD TO ROTATE A READ/WRITE HEAD

FIELD OF THE INVENTION

The present invention relates generally to tape drives, and more particularly to adjusting read/write heads based on a rotational adjustment calculated from servo patterns.

BACKGROUND OF THE INVENTION

Advanced magnetic-tape cartridges hold multiple terabytes of data. The recording densities necessary to achieve this capacity require that the read elements have nearly or identically the width of the read/write head elements. This presents an environmentally-induced density-limitation as magnetic tape is exposed to changes in temperature and humidity. If a tape is written in a climate having a high temperature and a low humidity, the tape will be wider (expanded along the Y-axis) than if it is later read at a low temperature and low humidity. Thus, when the tape is read, the read elements may read data from adjacent tracks resulting in a poor signal-to-noise ratio.

Servo patterns may be used to determine the extent of the environmental effects, i.e., the extent to which a read/write head is reading off the track. In timing-based servo (TBS) systems, recorded servo patterns consist of magnetic transitions with two different azimuthal slopes. The read/write head position is derived from the relative timing of pulses, or dibits, generated by a narrow servo element reading the servo pattern. TBS patterns also allow the encoding of additional longitudinal position (LPOS) information without affecting the generation of the transversal position error signal (PES). This is obtained by shifting transitions from their nominal pattern position using pulse-position modulation (PPM). A specification for the servo format in current tape drives is provided by the linear tape-open (LTO) format. The completed format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the Internet at ultrium.com. Traditionally, the detection of LPOS information bits is based on the observation of the arrival times of the shifted dibit peaks within the servo bursts at the servo reader output.

TBS technology, which was developed specifically for linear tape drives and is also used in all LTO tape drive products, provides the basic structure of a servo frame, consisting of four servo bursts. The signal obtained by reading the servo pattern is used to extract essential servo-channel parameters such as tape velocity, read/write head Y-position, and LPOS information, which is encoded by using PPM.

SUMMARY OF THE INVENTION

In one implementation, a method is presented to rotate a read/write head rotatable along a first axis and comprising a first assembly having a first servo element and a second servo element. The method moves a sequential information storage medium adjacent to the read/write head along a second axis, wherein the second axis is substantially orthogonal to the first axis, and determines the rotation angle for the read/write head with respect to the sequential information storage medium using the first servo element and the second servo element. The method then positions the read/write head with respect to the second axis based upon the rotation angle.

In another implementation, an article of manufacture is presented comprising a computer readable medium comprising computer readable program code disposed therein to rotate a read/write head rotatable along a first axis and comprising a first assembly having a first servo element and a second servo element. The computer readable program code moves a sequential information storage medium adjacent to the read/write head along a second axis, wherein the second axis is substantially orthogonal to the first axis, and determines the rotation angle for the read/write head with respect to the sequential information storage medium using the first servo element and the second servo element. The computer readable program code then positions the read/write head with respect to the second axis based upon the rotation angle.

In yet another implementation, a computer program product encoded in a computer readable medium is presented, the computer program product being usable with a programmable processor to rotate a read/write head rotatable along a first axis and comprising a first assembly having a first servo element and a second servo element. The computer program product includes computer readable program code which causes the programmable processor to move a sequential information storage medium adjacent to the read/write head along a second axis, wherein the second axis is substantially orthogonal to the first axis, and to determine the rotation angle for the read/write head with respect to the sequential information storage medium using the first servo element and the second servo element. The computer readable program code then causes the programmable processor to position the read/write head with respect to the second axis based upon the rotation angle.

BRIEF DESCRIPTION OF THE DRAWINGS

Implementations of the invention will become more apparent from the detailed description set forth below when taken in conjunction with the drawings, in which like elements bear like reference numerals.

FIG. 3A is a block diagram illustrating a first sequential information storage medium architecture;

FIG. 3C is a block diagram illustrating a second sequential information storage medium architecture;

FIG. 7A, is a flow chart summarizing Applicants' method;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow charts included are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
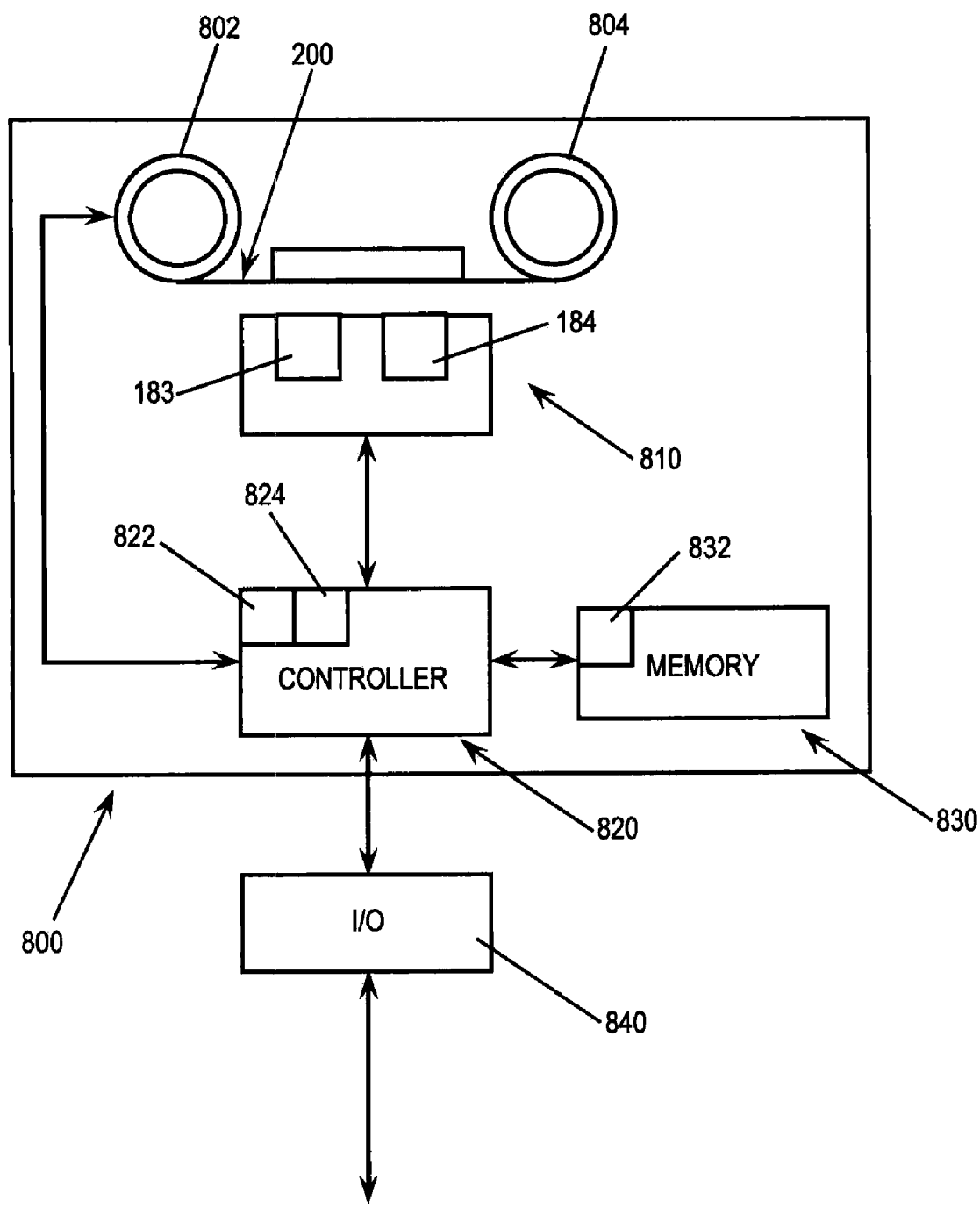
FIG. 8 is a block diagram illustrating Applicants' tape drive apparatus.

Referring now to FIG. 8, when writing data to a sequential information storage medium 200 (FIGS. 2A, 2B, 3A, 3C, 6, and 8), such as a magnetic tape, a portion of the medium is disposed on a first rotatable reel, such as reel 802, and a portion of the medium is disposed on a second rotatable reel, such as reel 804. The rotatable reels are moved such that sequential information storage medium 200 is moved from one reel, past read/write head 810, and onto to the other reel. Read/write head 810 comprises write element 183 and corresponding read element 184. Write element 183 encodes information in sequential information storage medium 200 as that medium travels past write element 183. In order to verify a successful write operation, read element 184 immediately reads the information encoded by write element 184. As those skilled in the art will appreciate, read/write head 810 may comprise other elements and components not shown in FIG. 8.

In the illustrated embodiment of FIG. 8, read/write head 810 is in communication with controller 820. In certain embodiments, controller 820 is integral with read/write head 810. Further in the illustrated embodiment of FIG. 8, controller comprises processor 822 and data buffer 824. Controller 820 is in communication with computer readable medium 830 and I/O channel 840. Instructions 832 are encoded in computer readable medium 830.

In certain embodiments, computer readable medium 830 is integral with controller 820. In the illustrated embodiment of FIG. 8, reel 802, reel 804, read/write head 810, controller 820, and computer readable medium 830 are disposed within a drive apparatus 800. As those skilled in the art will appreciate, drive apparatus 800 may comprise other elements and components not shown in FIG. 8.

Figure 1:
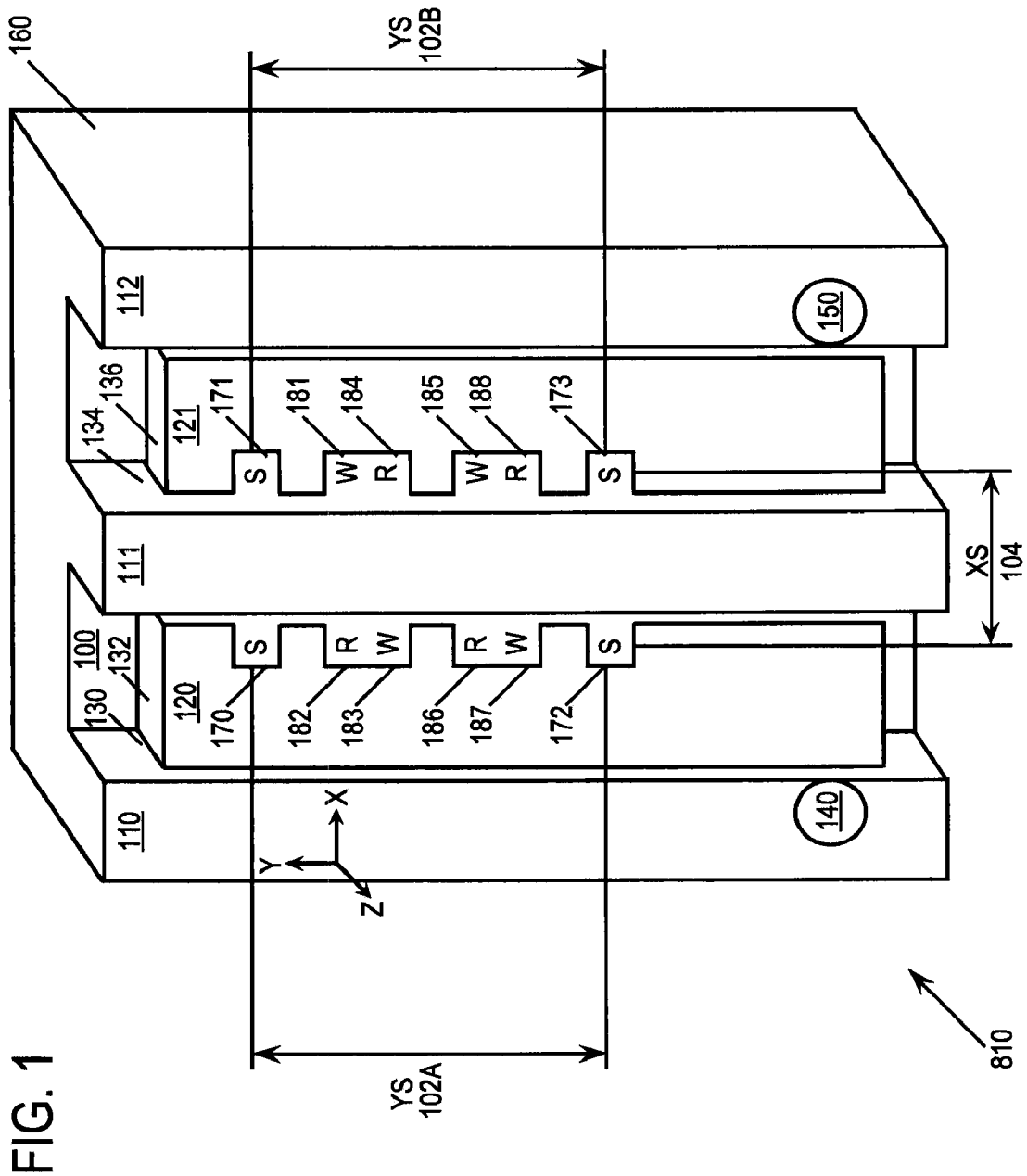
FIG. 1 is a perspective view of Applicants' read/write head.

FIG. 1 depicts read/write head 810. Magnetic or optical tape moves across read/write head 810 along the +/−X direction. Read/write head 810 comprises microsliders 120 and 121 that are articulated, i.e., moveable, in the +/−Y direction, which is considered the transverse or lateral direction relative to the direction in which the tape moves across read/write head 810. Microsliders 120 and 121 are constrained in the X direction by walls 110, 111, and 112, as depicted.

In the illustrated embodiment of FIG. 1, controllable micromotors 140 and - - - 150 allow microsliders 120 and 121 to move independently within read/write head 810. Micromotors 140 and 150 are disposed in walls 110, 111, and 112, as shown, and are in mechanical contact with microsliders 120 and 121. In certain embodiments, micromotors 140 and 150 are in a rack and pinion relationship with microsliders 120 and 121. In certain embodiments, micromotors 140 and 150 are located above or below microsliders 120 and 121. In yet other embodiments, micromotors 140 and 150 are disposed underneath microsliders 120 and 121.

Microsliders 120 and 121 provide "fine" position movement of the elements of read/write head 810 (e.g., read, write, servo) with respect to the tape. "Coarse" position movement along the +/−Y direction is provided by moving the entire head body block 160. As used herein, "fine," refers to movement of microsliders 120 and 121 along the +/−Y direction with greater resolution and faster dynamic response than the smallest incremental "coarse" movement, and is described herein with reference to the movement of microsliders 120 and 121. Likewise, as used herein, "coarse" refers to movement outside the range of the "fine" movement, and is described herein with reference to movement of the entire read/write head 810. It will be understood by one of ordinary skill in the art that overlap may exist between fine and coarse position movement.

Dynamically responsive fine seek capability is provided by microsliders 120 and 121, due to their inherently low mass. As depicted, microsliders 120 and 121 include servo elements 170-173, designated by the letter "S," data write elements 181, 183, 185 and 187, designated by the letter "W," and data read elements 182, 184, 186, and 188, designated by the letter "R." As will be understood by one of ordinary skill in the art, the quantity of read/write elements per microslider is typically a function of the quantity of grouped data tracks per module desired. The illustrated embodiment of FIG. 1 depicts two write and two read elements on each microslider 120 and 121. In certain embodiments, the actual implementation of a tape drive may include four, or more, read elements and four, or more, write elements on each microslider 120 and 121. The read, write, and servo elements can be attached directly to the microsliders, in a manner well understood in this art.

In the illustrated embodiment of FIG. 1, servo element 172 is disposed a distance 102A along the depicted Y-axis from servo element 170. Similarly, servo element 173 is disposed a distance 102B along the Y-axis from servo element 171. In certain embodiments, distance 102A, equals distance 102B, called YS. Further, in the illustrated embodiment of FIG. 1, servo element 173 is disposed a distance XS 104 along the depicted X-axis from servo element 172.

To permit bi-directional tape flow as well as write and read-verify (read-after-write) operations, a given read element on microslider 120 is positioned in line, along the X-axis, relative to a write element on microslider 121. By way of example and not limitation, when the tape is moving in the +X direction, write elements 183 and 187 write data and read elements 184 and 188, respectively, read-verify the written data. Likewise, when the tape is moving in the –X direction, write elements 181 and 185 write data and read elements 182 and 186, respectively, read-verify the written data.

In the illustrated embodiment of FIG. 1, paired read/write elements are depicted on separate microsliders. Such an embodiment reduces manufacturing costs and allows for a more dynamically articulated system. However, in certain embodiments, paired read/write elements are located on the same microslider.

In certain embodiments, microsliders 120 and 121 are disposed generally parallel to one another, and are arranged so that corresponding read/write elements are aligned. In other embodiments, microsliders 120 and 121 are not exactly parallel, but are arranged in other configurations which do not hinder significantly the read, write and/or servo processes.

It will be understood to those skilled in the art that micromotors 140 and 150 are depicted in FIG. 1 as comprising rotary-type motors. However, microsliders 120 and 121 could similarly be moved in the Y direction by linear stepper motors in which the microsliders themselves could comprise the moving portion of the linear motor. In such a construction, the step resolution for the linear motor would be designed to be within the resolution of the fine seek movement.

Figure 7B:
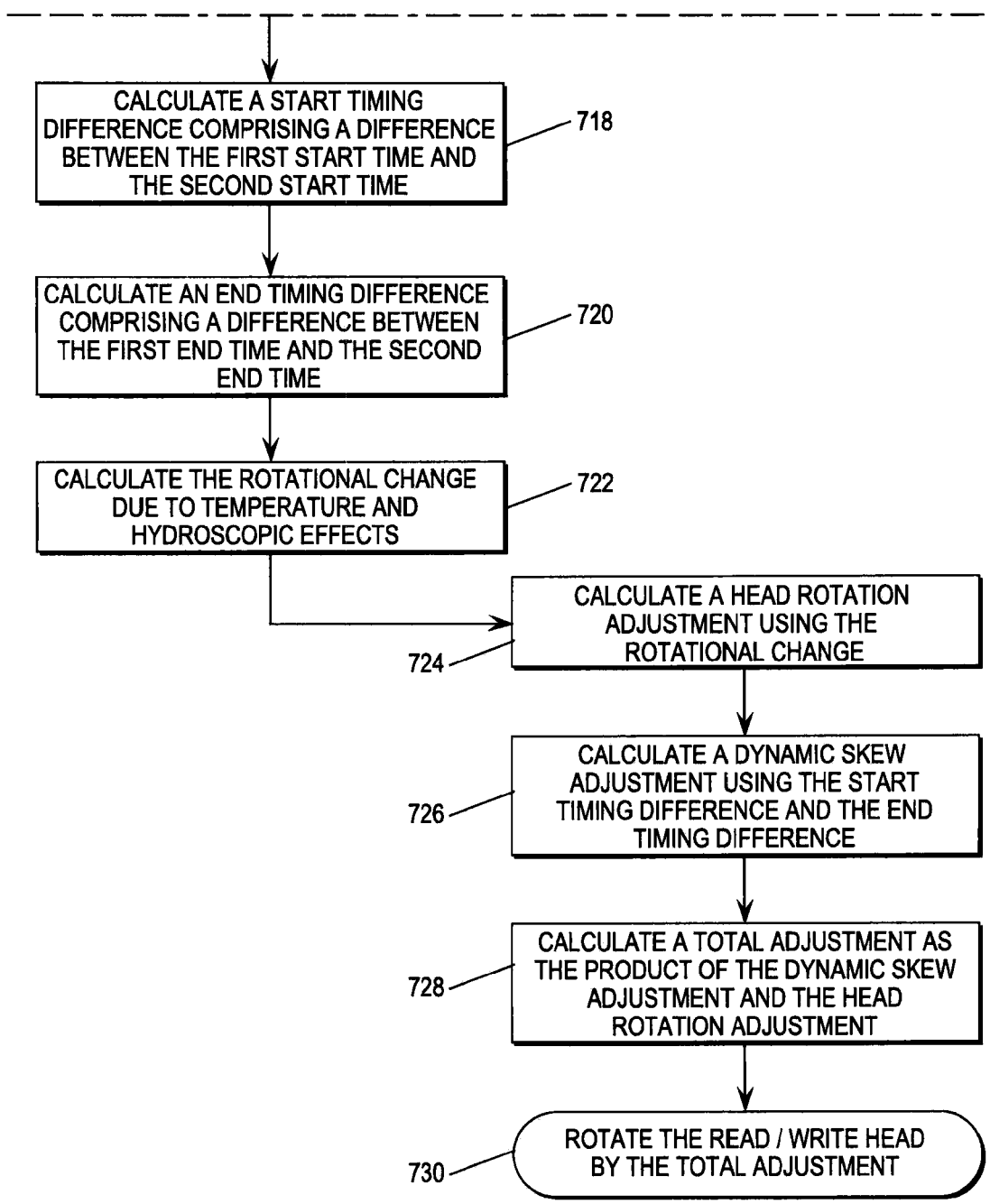
FIG. 7B, is a flow chart summarizing additional Applicants' method.

Applicants' invention comprises a method to adjust the rotation of a read/write head, such as read/write head 810, or a microslider, such as microslider 120 or 121, about the Z-axis to compensate for environmentally induced changes in the dimension of a magnetic tape. FIGS. 7A and 7B summarizes Applicants' method. Referring now to FIG. 7A, as indicated by block 702, a read/write head rotatable along the Z axis of FIG. 1 is supplied, and comprising a first assembly having a first servo element and a second servo element.

As indicated by block 704, the method moves a sequential information storage medium adjacent to the read/write head along a second axis, such as the X-axis shown in FIG. 1, wherein the second axis is essentially orthogonal to the first axis. By "substantially orthogonal," Applicants mean the second axis in combination with the first axis defines an angle of ninety degrees (90°), plus or minus ten degrees (10°).

Figure 2A:
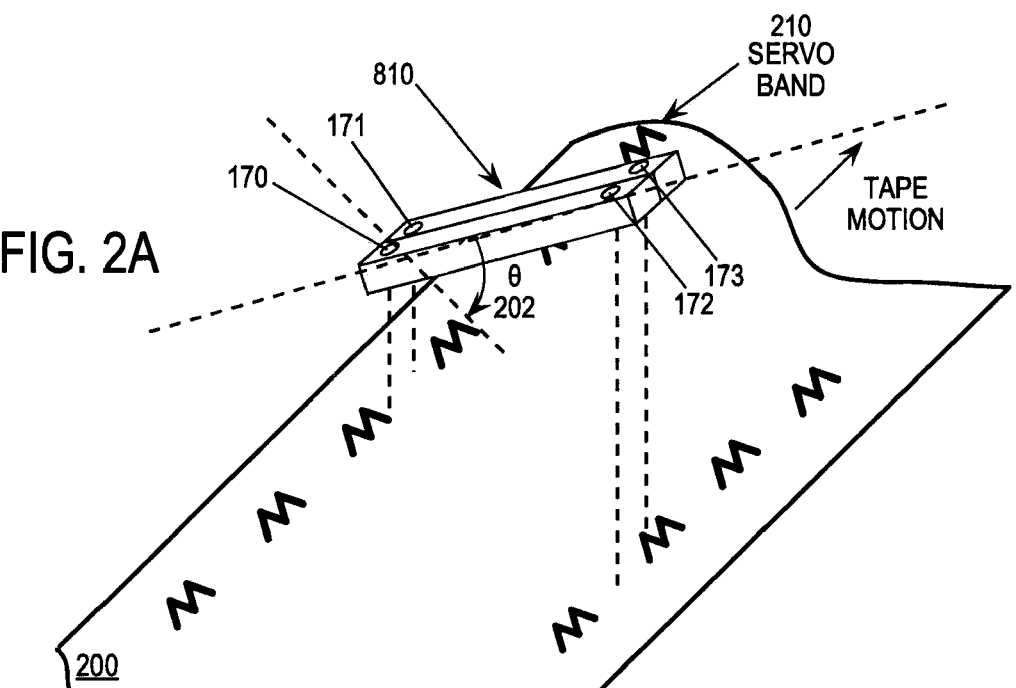
FIG. 2A is a perspective view illustrating a sequential tape medium being moved adjacent to Applicants' read/write head, wherein the read/write head is at an angle different than ninety degrees (90°) to the tape medium.

In the illustrated embodiment of FIG. 2A, read/write head 810 is reading servo bands 210 and 220 as the sequential information storage medium 200 travels past read/write head 810 at a tape velocity V_tape. In FIG. 2A, there are no environmentally induced changes in the dimensions of sequential information storage medium 200 and therefore servo band 210 is aligned with servo elements 170 and 171 and servo band 220 is aligned with servo elements 172 and 173.

In the illustrated embodiment of FIG. 2A, it should be noted that read/write head 810 is not at a ninety degrees (90°) angle when data is written. Rather read/write head 810 is at an angle θ 202 to allow read/write head 810 to rotate either clockwise or counter clockwise to correct for the environmental effects of temperature and humidity. Angle θ 202 may, by way of example and not limitation, be eight-five (85°) to eighty-eight degrees (88°).

Figure 2B:
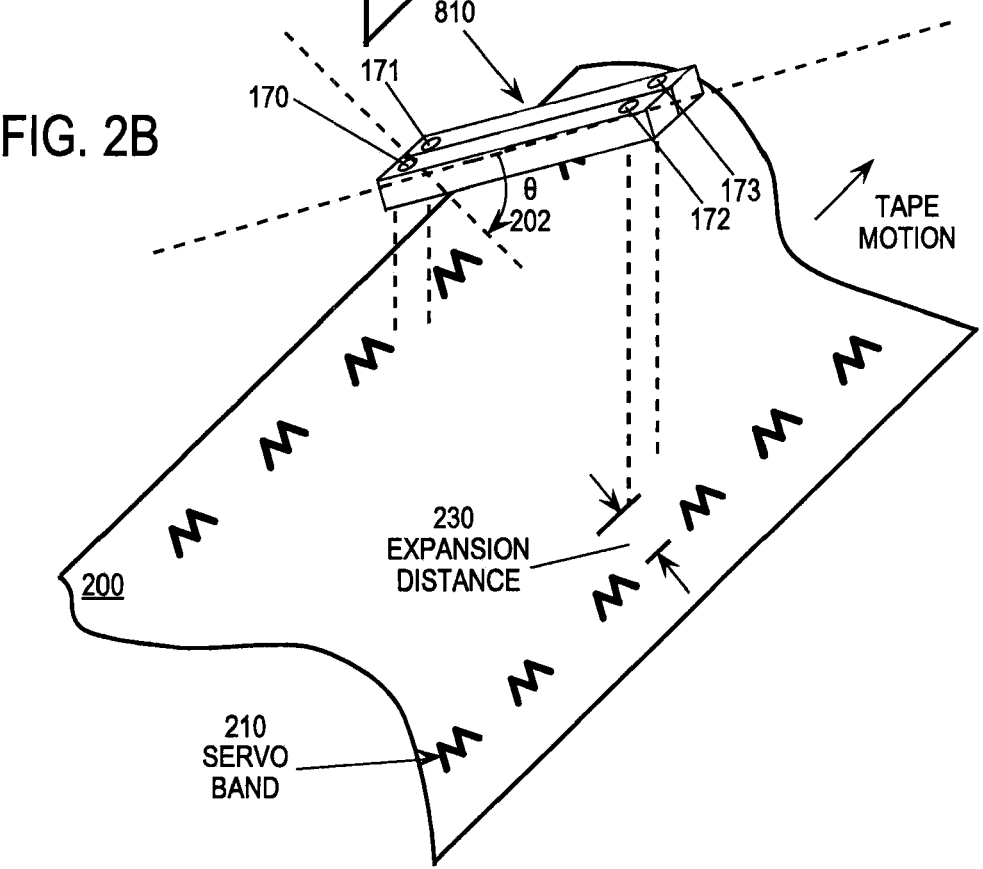
FIG. 2B is a perspective view illustrating a sequential tape medium being moved adjacent to Applicants' read/write head, wherein the tape medium has expanded due to thermal and/or hydroscopic effects.

In FIG. 2B, sequential information storage medium 200 has expanded in the direction of a third axis, such as the Y-axis shown in FIG. 1, due to thermal and/or hydroscopic changes. Thus, the distance between servo band 220 and servo band 210 is no longer equal to the distance between servo elements 170 and 171 and servo elements 172 and 173, but instead is equal to the distance 102 plus an expansion distance 230.

Figure 6:
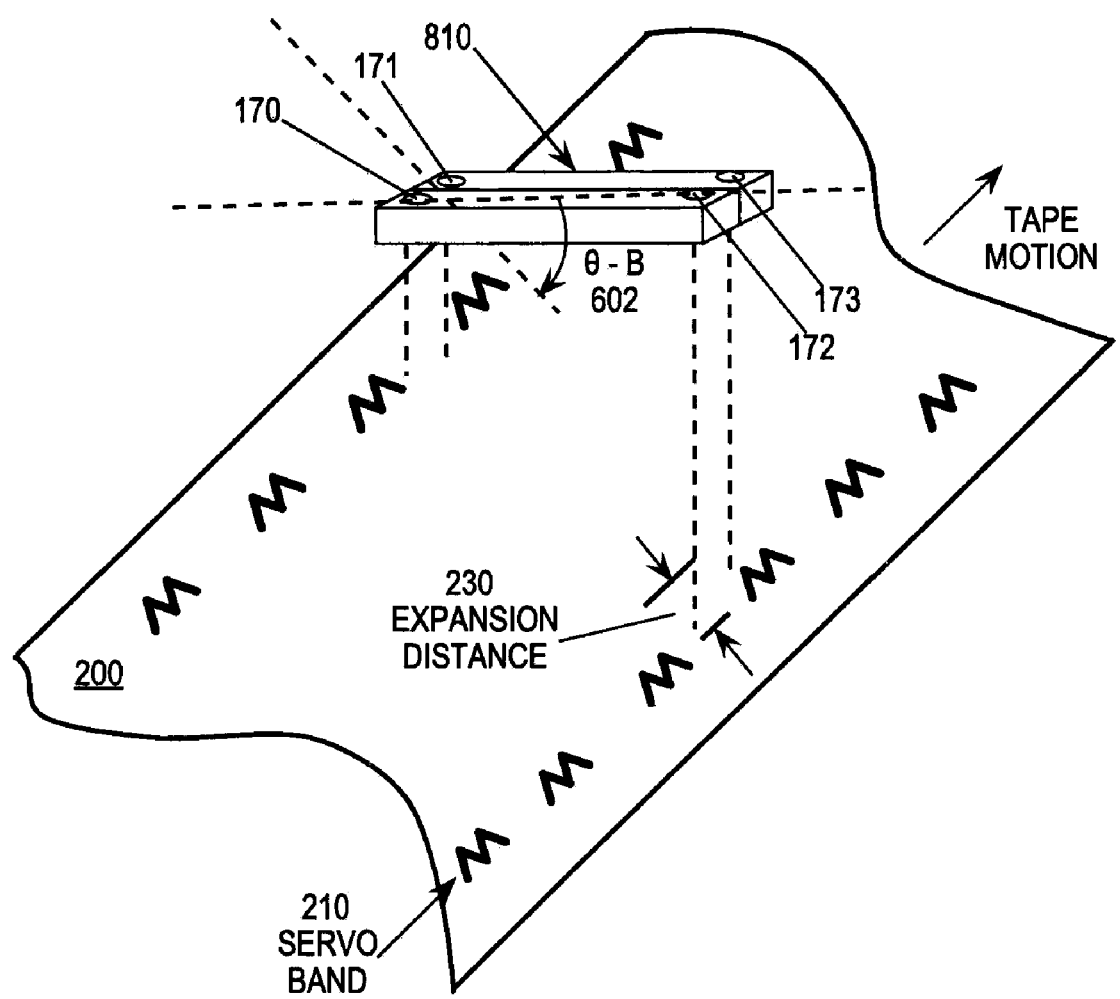
FIG. 6 is a perspective view illustrating a sequential tape medium being moved adjacent to Applicants' read/write head, wherein the read/write head has been rotated to compensate for thermal and hydroscopic effects.

To compensate for expansion distance 230, Applicants' method rotates read/write head 810 along the Z axis a sufficient distance to align servo elements 172 and 172 with servo band 220, as illustrated in FIG. 6. Specifically, read/write head 810 has been rotated about the Z axis from a center point of read/write head 810. Read/write head 810 is now at an angle θ-B 602.

Referring again to FIG. 7A, as indicated by block 706, the method detects a first servo band using the first servo element indicated by block 702, such as for example servo element 170 (FIG. 1). In certain embodiments, this is performed by a controller, such as controller 820, in communication with the read/write head indicated by block 702. As indicated by block 708, the method detects a second servo band using the second servo element indicated by block 702, such as for example servo element 172 (FIG. 1). In certain embodiments, this is performed by a controller, such as controller 820, in communication with the read/write head of step 702.

In the illustrated embodiment of FIG. 3A, sequential information storage medium 200 comprises a first servo band 210, a second servo band 220, and (N) data bands written between servo band 210 and servo band 220. Servo band 210 comprises servo patterns 310, 320, 330, 340, 350, and 360. Servo band 220 comprises servo patterns 315, 325, 335, 345, 355, and 365. In the illustrated embodiment of FIG. 3A, servo patterns 310 and 315 are aligned with one another, such that if sequential information storage medium 200 is moved orthogonal to read/write head 810, servo element 170 detects servo pattern 310 at the same time that servo element 172 detects servo pattern 315.

Referring once again to FIG. 7A, as indicated by block 710, the method determines a first start time when the first servo element detects a first pattern disposed in the first servo band. As indicated by block 712, the method detects a first end time when the first servo element no longer detects the first pattern disposed in the first servo band. As indicated by block 714, the method determines a second start time when the second servo element detects a first pattern disposed in the second servo band. As indicated by block 716, the method detects a second end time when the second servo element no longer detects the first pattern disposed in the second servo band. In certain embodiments, some or all of the processes indicated by blocks 710, 712, 714, and 716 are performed by a controller, such as controller 820, in communication with the read/write head as indicated by block 702.

Figure 3B:
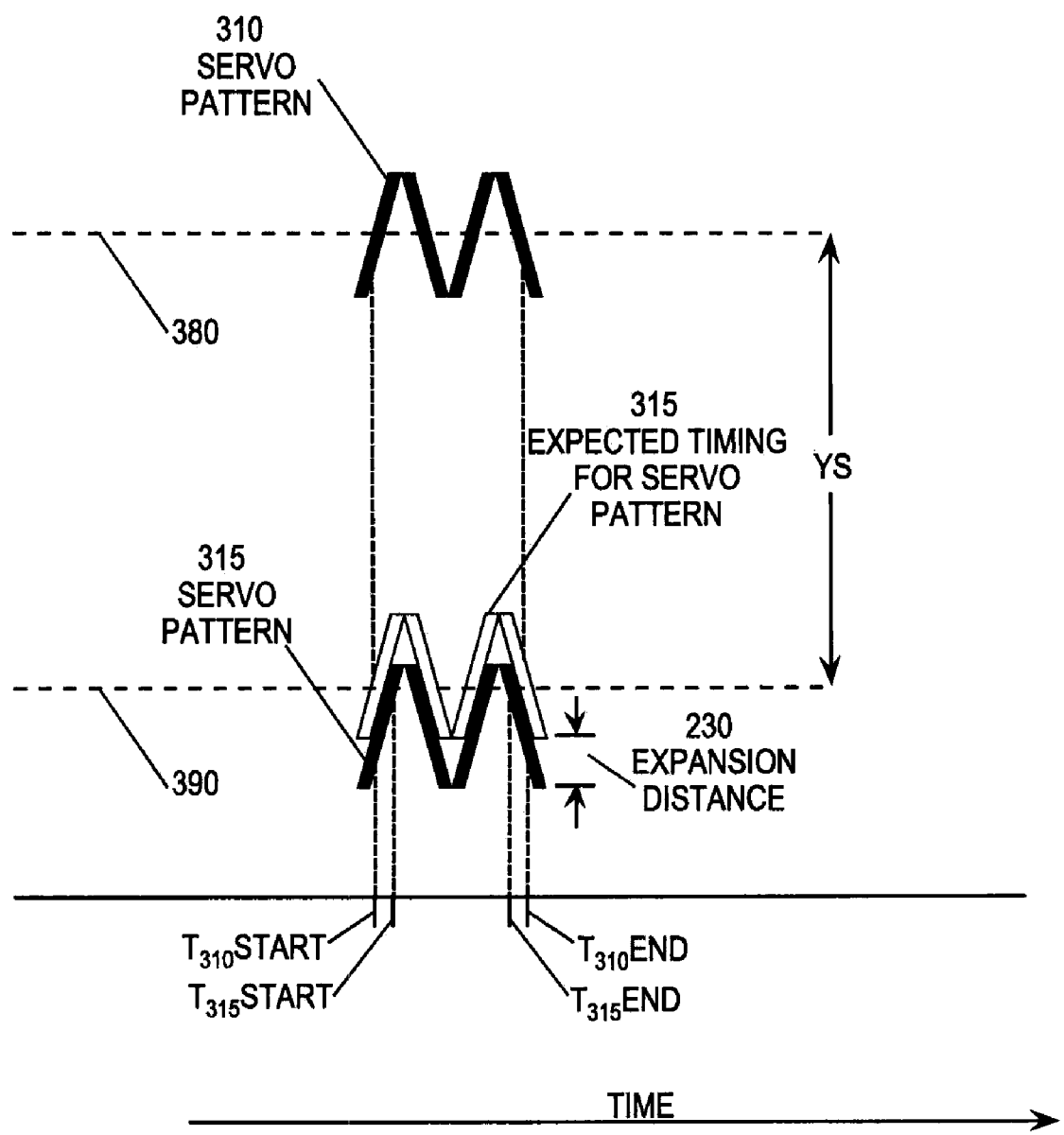
FIG. 3B illustrates timings when associated servo patterns are detected using sequential storage medium architecture of FIG. 3A and the thermal and/or hydroscopic expansion of FIG. 2B.

Referring to FIGS. 1, 2B, 3A, and 3B, if tape medium is moved past read/write head 810 when expanded as depicted in FIG. 2B, then servo pattern 315 is a greater distance from servo pattern 310 than expected. As shown in FIG. 3B, the result is that servo element 170, traveling trajectory 380, detects servo pattern 310 before servo element 172, traveling trajectory 390, detects servo pattern 315. Specifically, servo element 170 first detects the initial portion of servo pattern 310 at time $T_{310}$Start, while servo element 172 first detects the initial portion of servo pattern 315 at a later time $T_{315}$Start.

Likewise, servo element 170 detects the final portion of servo pattern 310 at time $T_{310}$End, while servo element 172 detects the final portion of servo pattern 315 at an earlier time $T_{315}$End. Thus:

$$(T_{310}\text{End}-T_{310}\text{Start}) > (T_{315}\text{End}-T_{315}\text{Start}).$$

This timing difference represents the environmentally induced changes in the dimensions of sequential information storage medium 200. When using tape architecture of FIG. 3A, the timing difference is zero if the are no changes in humidity and temperature. As the temperature and/or humidity increases, sequential information storage medium 200 expands and ($T_{315}$End$-T_{315}$Start) decreases. Although not depicted, it will be understood that as the temperature and/or humidity decreases, sequential information storage medium 200 contracts and therefore ($T_{315}$End$-T_{315}$Start) increases and will be greater than ($T_{310}$End$-T_{310}$Start).

Figure 3D:
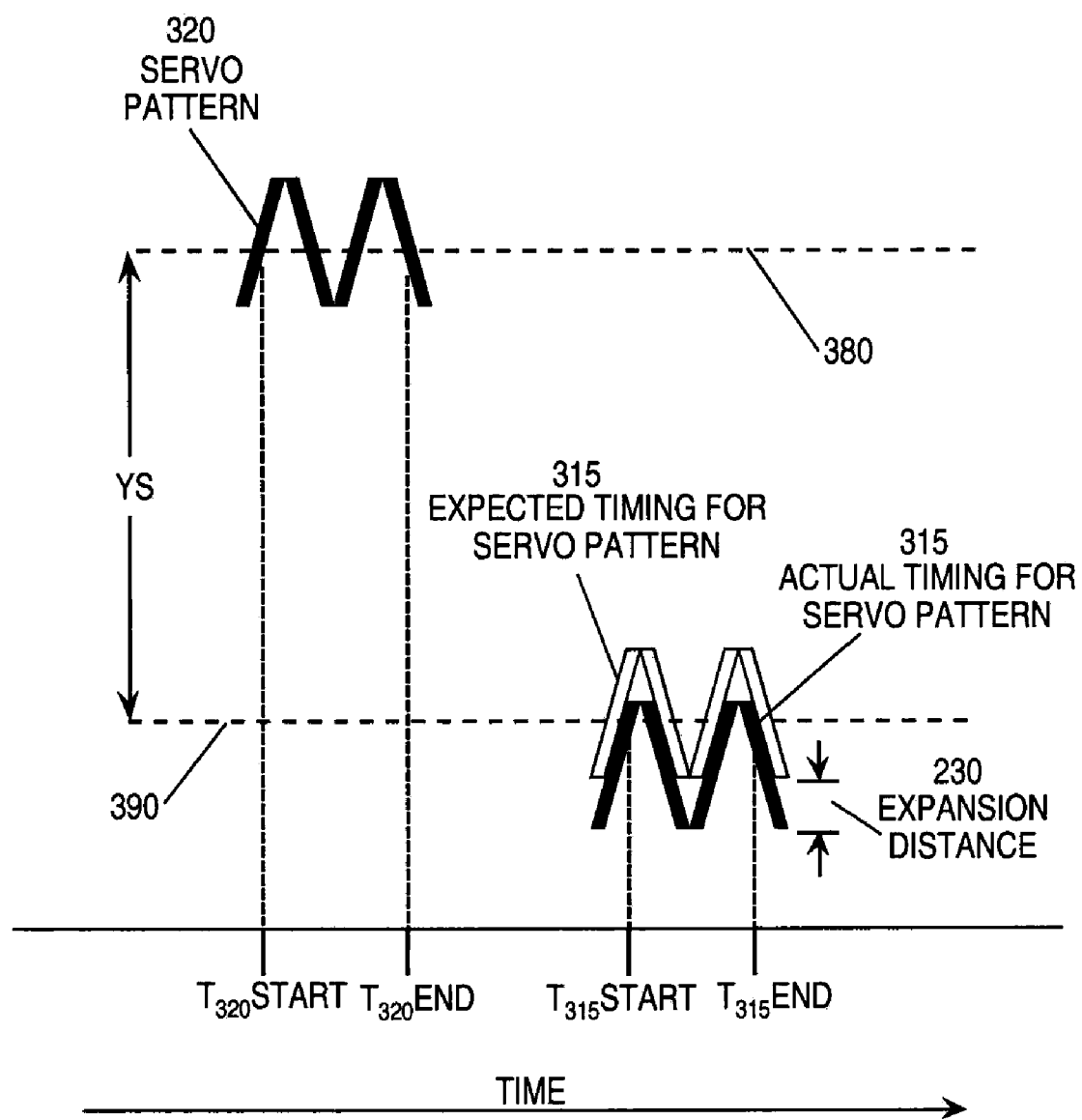
FIG. 3D illustrates timings when associated servo patterns are detected using sequential storage medium architecture of FIG. 3C and the thermal and/or hydroscopic expansion of FIG. 2B.

Referring now to FIGS. 3C and 3D, in certain sequential information storage medium architectures servo patterns encoded in servo band 210 and servo band 220 are intentionally offset from one another. In the illustrated embodiment of FIG. 3C, the individual servo patterns comprising servo pattern pairs 310/315, 320/325, 330/335, 340/345, 350/355, and 360/365 are offset from one another. When using a sequential information storage medium architecture of FIG. 3C, the time it takes servo element 170 to traverse servo pattern 310 will still be greater than the time it takes servo element 172 to traverse servo pattern 315.

Referring once again to FIG. 7B, as indicated by block 718, the method calculates the timing difference between the first start time and the second start time. As indicated by block 720, the method then calculates the timing difference between the first end time and the second end time. In certain embodiments, one or both of the processes indicated by blocks 718 and 720 are performed by a controller, such as controller 820, in communication with the read/write head as indicated by block 702.

Figure 5:
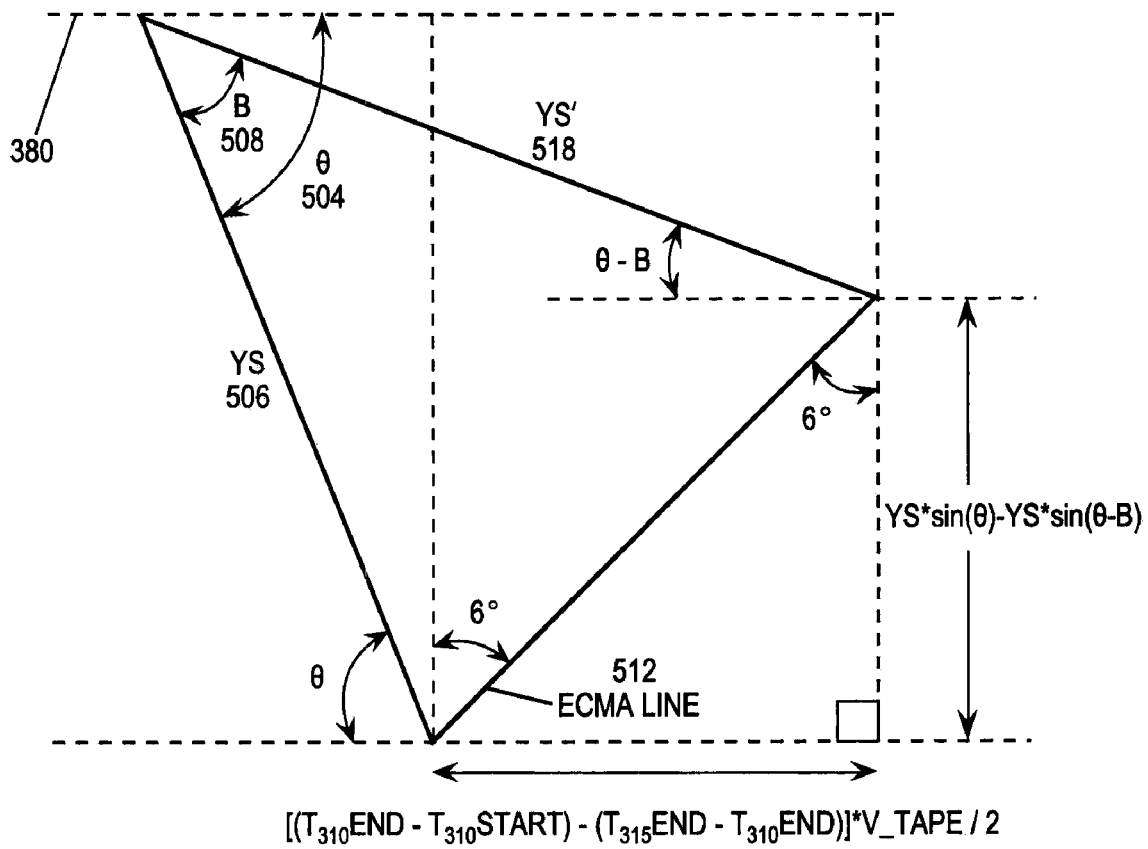
FIG. 5 graphically illustrates Applicants' method to determine a rotation of the read/write head which compensates for thermal and hydroscopic effects.

As indicated by block 722 (FIG. 7B), the method then calculates the rotation angle B, to compensate for an incremental change in the initial angle θ. FIG. 5 graphically illustrates determining rotation angle B. Applicants' method forms an isosceles triangle, wherein each of the two equal sides comprise a distance, such as distance 506 and distance 518, separated by angle B 508. Using trajectory 380 as a datum, distance 506 is extended downward at an angle θ 504. Drawing line 502 parallel to trajectory 380 at the end of distance 506, ECMA line 512 can then be drawn at an angle of six degrees (6°). As will be understood by one of ordinary skill in the art ECMA refers to the European Computer Manufacturers' Association and six degrees (6°) is the angle defined by EMCA-319 for a timing based servo.

ECMA line 512 comprises a distance calculated as one half of the distance traveled while a servo element, such as servo element 170, traverses a servo pattern that is correctly positioned beneath the servo element, such as servo pattern 310, less difference in the ending time for the detection of that servo pattern and the ending time for the detection of the servo pattern that has been shifted due to environmental changes, such as pattern 315. Using trigonometry, angle B 508 can then be solved for:

$$B=[(T_{310}\text{End}-T_{310}\text{Start})-(T_{315}\text{End}-T_{310}\text{End})]*V\_tape/[2*YS*\tan(6°)]-1. \quad (1)$$

In certain embodiments, calculating angle B 508, as indicated by block 722, is performed by a controller, such as controller 820, in communication with the read/write head as indicated by block 702.

Returning to FIG. 7B, as indicated by block 724, the Head Rotation Adjustment is calculated using angle B 508 according to equation (2) below:

$$\text{Head Rotation Adjustment}=-XS*\text{COTAN}(\theta-B) \quad (2)$$

wherein distance 104 (FIG. 1) is the distance between comparable servo elements disposed on two different microsliders, such as servo element 172 (FIG. 1) disposed on microslider 120 (FIG. 1) and servo element 173 (FIG. 1) disposed on microslider 121 (FIG. 1). In certain embodiments, determining the Head Rotation Adjustment, as indicated by block 724, is performed by a controller, such as controller 820, in communication with the read/write head as indicated by block 702.

To determine the total rotational adjustment necessary, the Dynamic Skew Adjustment must also be calculated, as indicated by block 726. As known in the art, the expansion or contracting of sequential information storage medium 200 (FIGS. 2A, 2B, 3A, 3C, 6, and 8) due to thermal or hydroscopic changes can additionally cause sequential information storage medium 200 to become skewed with respect to read/write head 810 (FIG. 1). The distance that servo element 170 and 172 are reading off track is the Dynamic Skew Adjustment, shown as equation (3) below:

$$\text{Adjustment}=-XS*(T_{315}\text{End}-T_{310}\text{End}+T_{315}\text{Start}-T_{310}\text{Start})*V\_\text{tape}/(2*YS) \quad (3)$$

In certain embodiments, calculating the Dynamic Skew Adjustment, as indicated by block 726, is performed by a controller, such as controller 820, in communication with the read/write head as indicated by block 702.

As indicated by block 728, the Total Rotational Adjustment can then be calculated as the produce of the Head Rotation Adjustment and the Dynamic Skew Adjustment, as provided by equation (4) below:

$$\text{Total}=-XS*\{(T_{315}\text{End}-T_{310}\text{End}+T_{315}\text{Start}-T_{310}\text{Start})*V\_\text{tape}/(2*YS)+\text{COTAN}(\theta B)\} \quad (4)$$

In certain embodiments, calculating the Total Rotational Adjustment, as indicated by block 728, is performed by a controller, such as controller 820, in communication with the read/write head as indicated by block 702.

Finally, as indicated by block 730, read/write head 810 is rotated by the Total Rotational Adjustment given by equation 4. In certain embodiments, rotating read/write head 810, as indicated by block 730, is performed by a controller, such as controller 820, in communication with the read/write head as indicated by block 702. FIG. 6 illustrates sequential information storage medium 200 being moved adjacent to read/write head 810, wherein read/write head 810 has been rotated to compensate for thermal and hydroscopic effects.

Figure 4:
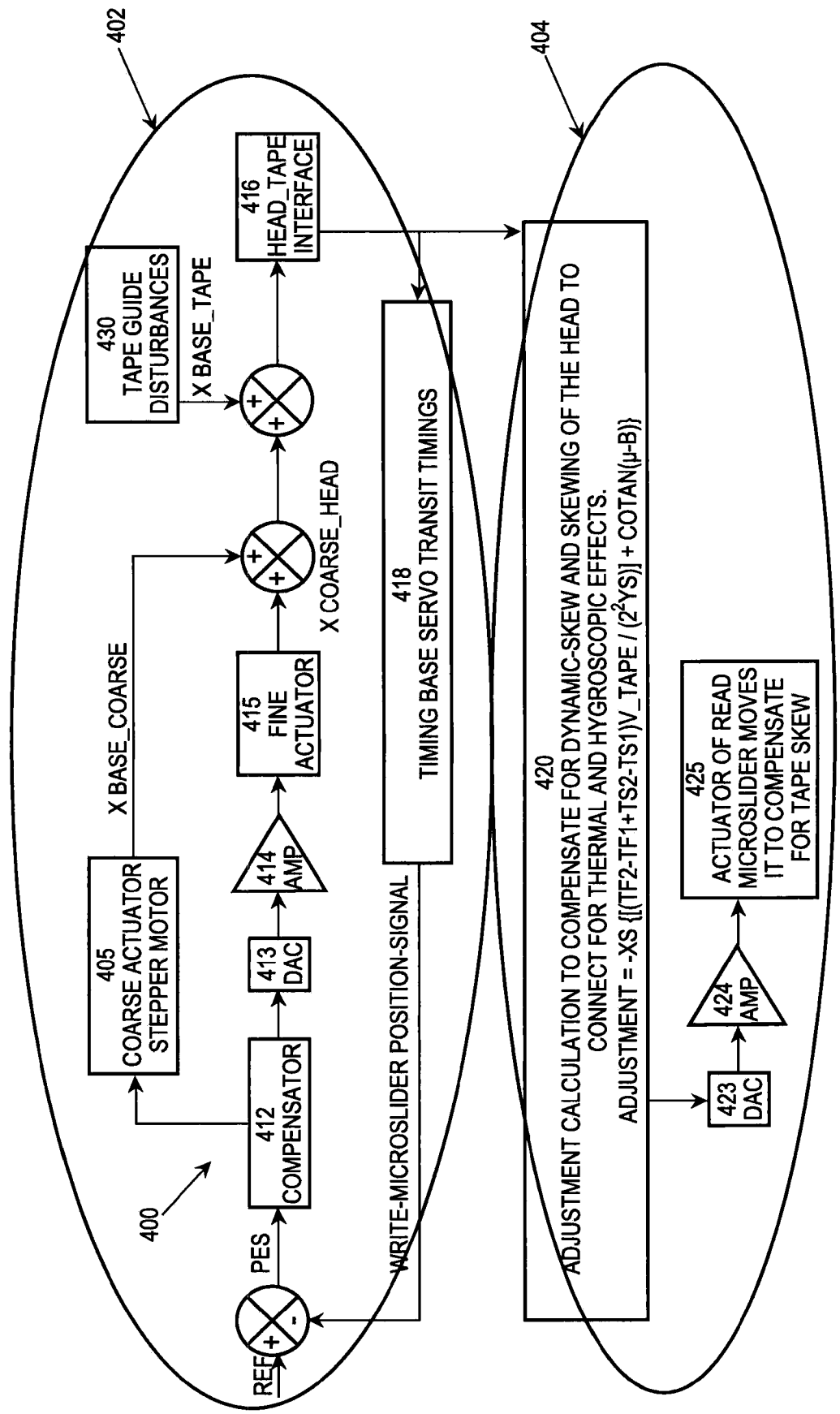
FIG. 4 illustrates a first embodiment of Applicants' circuitry to implement Applicants' method.

FIG. 4 illustrates one embodiment of Applicants' circuitry 400. In certain embodiments, circuitry 400 is disposed in a controller, such as controller 820 (FIG. 1), in communication with the read/write head as indicated by block 702 (FIG. 7A), such as read/write head 810 (FIG. 1). Circuitry 400 comprises a first control circuit 402 and a second control circuit 404. The first control circuit 402 utilizes two servo elements disposed on a write microslider, such as servo elements 170 (FIG. 1) and 172 (FIG. 1) disposed on microslider 120 (FIG. 1), wherein write element 183 (FIG. 1) is encoding information in a sequential information storage medium.

In control circuit 402, timing based servo (TBS) transit times, derived from servo bands 210 (FIGS. 2A, 2B, 3A, 3C, and 6) and 220 (FIGS. 2A, 2B, 3A, 3C, and 6) in block 418, are used by fine actuator 415 to position the write microslider to write information along a designed data track. Course-actuator 405 with compensator integrator 412 positions body 160 (FIG. 1) of read/write head 810 (FIG. 1) to enable the fine-actuator 415 to operate in a center of its stroke. First control circuit components 412, 413, 414, 415, 416, and 418 define a closed-loop system.

The second control circuit 404 calculates the Total Rotational Adjustment to compensate for thermal and hygroscopic effects, as described hereinabove. The second control circuit 404 components 420, 423, 424, and 425 comprise an open-loop system.

In certain embodiments, individual processes described in connection with FIGS. 7A and 7B may be combined, eliminated, or reordered.

In certain embodiments, instructions, such as instructions 832 (FIG. 8), are encoded in computer readable medium, such as computer readable medium 830 (FIG. 8), wherein those instructions are executed by a processor, such as processor 822 (FIG. 8), to perform one or more of the blocks 702, 704, 706, 708, 710, 712, 714, 716, 718, 720, 722, 724, 726, 728, and/or 730 recited in FIGS. 7A and 7B.

In yet other embodiments, the invention includes instructions residing in any other computer program product, where those instructions are executed by a computer external to, or internal to, tape drive apparatus 800 (FIG. 8) to perform one or more of the blocks 702, 704, 706, 708, 710, 712, 714, 716, 718, 720, 722, 724, 726, 728, and/or 730 recited in FIGS. 7A and 7B. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present inventions.

What is claimed is:

1. A method to position a read/write head comprising a first assembly having a first servo element and a second servo element, the method comprising:
moving a sequential information storage medium adjacent to the read/write head wherein said sequential information storage medium comprises a plurality of data bands encoded along a longitudinal axis;
determining a rotation angle for the read/write head with respect to the sequential information storage medium using the first servo element and the second servo element; and
positioning the read/write head with respect to the sequential information storage medium based upon the rotation angle.

2. The method of claim 1, wherein the sequential information storage medium comprises a first servo band and a second servo band, the method further comprising:
detecting the first servo band using the first servo element; and
detecting the second servo band using the second servo element.

3. The method of claim 2, further comprising:
determining a first start time when the first servo element detects a first servo pattern disposed in the first servo band;
determining a first end time when the first servo element no longer detects the first servo pattern disposed in the first servo band;
calculating a first timing difference comprising the difference between the first end time and the first start time;
determining a second end time when the second servo element no longer detects a first servo pattern disposed in the second servo band;
calculating a second timing difference comprising the difference between the second end time and the first end time; and
setting the rotation angle using the first timing difference, and the second timing difference.

4. The method of claim 3, wherein:
the first servo element is disposed a first distance from the second servo element;
the tape is moving past the read/write head at a velocity; and
said setting further comprises calculating the rotation angle using the first distance, the first timing difference, the second timing difference, and the velocity.

5. The method of claim 4, wherein the first servo element is disposed a second distance from a third servo element disposed in a second assembly, the method further comprising:
determining a second start time when the second servo element detects the first servo pattern disposed in the second servo band;
calculating a third timing difference comprising the difference between the second start time and the first start time;
calculating a total rotational adjustment using the rotation angle, the second timing difference, the third timing difference, and the second distance; and
offsetting the read/write head with respect to a current position of the read/write head by the total rotational adjustment.

6. The method of claim 2, wherein said supplying a read/write head further comprises:
supplying a read/write head comprising a first control circuit, a second control circuit, and a switch interconnected to both the first control circuit and the second control circuit;
wherein the first control circuit utilizes the first servo element and the second servo element to determine a plurality of servo transit timings;
wherein the second control circuit utilizes the plurality of servo transit timings to determine the rotation angle;
activating the first control circuit during a first time period; and
activating the second control circuit during a second time period, wherein the first time period differs from the second time period.

7. The method of claim 6, further comprising positioning the read/write head by the second control circuit based upon the rotation angle.

8. An article of manufacture comprising a microprocessor and a computer readable medium comprising computer readable program code disposed therein for servo control of a read/write head comprising a first assembly having a first servo element and a second servo element, the computer readable program code comprising a series of computer readable program steps to effect:
moving a sequential information storage medium adjacent to the read/write head wherein said sequential information storage medium comprises a plurality of data bands encoded along a longitudinal axis;
determining a rotation angle for the read/write head with respect to the sequential information storage medium using the first servo element and the second servo element; and positioning the read/write head with respect to the sequential information storage medium based upon the rotation angle.

9. The article of manufacture of claim 8, wherein the sequential information storage medium comprises a first servo band and a second servo band, the computer readable program code further comprising a series of computer readable program steps to effect:

detecting the first servo band using the first servo element; and detecting the second servo band using the second servo element.

10. The article of manufacture of claim 9, the computer readable program code further comprising a series of computer readable program steps to effect:

determining a first start time when the first servo element detects a first servo pattern disposed in the first servo band;

determining a first end time when the first servo element no longer detects the first servo pattern disposed in the first servo band;

calculating a first timing difference comprising the difference between the first end time and the first start time;

determining a second end time when the second servo element no longer detects a first servo pattern disposed in the second servo band;

calculating a second timing difference comprising the difference between the second end time and the first end time; and setting the rotation angle using the first timing difference, and the second timing difference.

11. The article of manufacture of claim 10, wherein:

the first servo element is disposed a first distance from the second servo element;

the tape is moving past the read/write head at a velocity; and said setting further comprises a series of computer readable program steps to effect calculating the rotation angle using the first distance, the first timing difference, the second timing difference, and the velocity.

12. The article of manufacture of claim 11, wherein the first servo element is disposed a second distance from a third servo element disposed in a second assembly, the computer readable program code further comprising a series of computer readable program steps to effect:

determining a second start time when the second servo element detects the first servo pattern disposed in the second servo band;

calculating a third timing difference comprising the difference between the second start time and the first start time;

calculating a total rotational adjustment using the rotation angle, the second timing difference, the third timing difference, and the second distance; and offsetting the read/write head with respect to a current position of the read/write head by the total rotational adjustment.

13. The article of manufacture of claim 9, wherein said supplying a read/write head further comprises a series of computer readable program steps to effect:

supplying a read/write head comprising a first control circuit, a second control circuit, and a switch interconnected to both the first control circuit and the second control circuit;

wherein the first control circuit utilizes the first servo element and the second servo element to determine a plurality of servo transit timings;

wherein the second control circuit utilizes the plurality of servo transit timings to determine the rotation angle;

activating the first control circuit during a first time period; and activating the second control circuit during a second time period, wherein the first time period differs from the second time period.

14. The article of manufacture of claim 13, the computer readable program code further comprising a series of computer readable program steps to effect positioning the read/write head by the second control circuit based upon the rotation angle.

15. A computer program product encoded in a computer readable medium, the computer program product being useable with a programmable computer processor for servo control of a read/write head rotatable along a first axis and comprising a first assembly having a first servo element and a second servo element, the computer program product comprising:

computer readable program code which causes said programmable processor to move a sequential information storage medium adjacent to the read/write head wherein said sequential information storage medium comprises a plurality of data bands encoded along a longitudinal axis;

computer readable program code which causes said programmable processor to detect a first servo band using the first servo element; and computer readable program code which causes said programmable processor to detect a second servo band using the second servo element;

computer readable program code which causes said programmable processor to determine a rotation angle for the read/write head with respect to the sequential information storage medium using the first servo element and the second servo element; and computer readable program code which causes said programmable processor to position the read/write head with respect to the sequential information storage medium based upon the rotation angle.

16. The computer program product of claim 15, further comprising:

computer readable program code which causes said programmable processor to determine a first start time when the first servo element detects a first servo pattern disposed in the first servo band;

computer readable program code which causes said programmable processor to determine a first end time when the first servo element no longer detects the first servo pattern disposed in the first servo band;

computer readable program code which causes said programmable processor to calculate a first timing difference comprising the difference between the first end time and the first start time;

computer readable program code which causes said programmable processor to determine a second end time when the second servo element no longer detects a first servo pattern disposed in the second servo band;

computer readable program code which causes said programmable processor to calculate a second timing difference comprising the difference between the second end time and the first end time; and computer readable program code which causes said programmable processor to set the rotation angle using the first timing difference, and the second timing difference.

17. The computer program product of claim 16, wherein:

the first servo element is disposed a first distance from the second servo element;

the tape is moving past the read/write head at a velocity; and said setting further comprises computer readable program code which causes said programmable processor to calculate the rotation angle using the first distance, the first timing difference, the second timing difference, and the velocity.

18. The computer program product of claim 17, wherein the first servo element is disposed a second distance from a third servo element disposed in a second assembly, the computer program product further comprising:

computer readable program code which causes said programmable processor to determine a second start time when the second servo element detects the first servo pattern disposed in the second servo band;

computer readable program code which causes said programmable processor to calculate a third timing difference comprising the difference between the second start time and the first start time;

computer readable program code which causes said programmable processor to calculate a total rotation adjustment using the rotational angle, the second timing difference, the third timing difference, and the second distance; and computer readable program code which causes said programmable processor to offset the read/write head with respect to a current position of the read/write head by the total rotational adjustment.

19. The computer program product of claim 16, wherein said computer readable program code which causes said programmable processor to supply a read/write head further comprises:

computer readable program code which causes said programmable processor to supply a read/write head comprising a first control circuit, a second control circuit, and a switch interconnected to both the first control circuit and the second control circuit;

wherein the first control circuit utilizes the first servo element and the second servo element to determine a plurality of servo transit timings;

wherein the second control circuit utilizes the plurality of servo transit timings to determine the rotation angle;

computer readable program code which causes said programmable processor to activate the first control circuit during a first time period; and computer readable program code which causes said programmable processor to activate the second control circuit during a second time period, wherein the first time period differs from the second time period.

20. The computer program product of claim 18, further comprising computer readable program code which causes said programmable processor to position the read/write head by the second control circuit based upon the rotation angle.

\* \* \* \* \*